Figure 1:
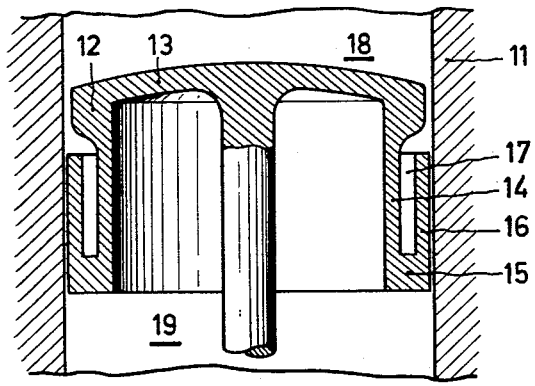

Feb. 25, 1964  J. K. PESMAN  3,122,066
CO-AXIALLY MOVABLE MEMBERS WITH FLEXIBLE SHEATH
FOR NARROWING THE GAP THEREBETWEEN
Filed Nov. 20, 1961

INVENTOR
JAN K. PESMAN

BY
AGENT

United States Patent Office 3,122,066
Patented Feb. 25, 1964

3,122,066
CO-AXIALLY MOVABLE MEMBERS WITH FLEXIBLE SHEATH FOR NARROWING THE GAP THEREBETWEEN
Jan Kornelis Pesman, Amsterdam, Netherlands, assignor to North American Philips Company, Inc., New York, N.Y., a corporation of Delaware
Filed Nov. 20, 1961, Ser. No. 153,551
Claims priority, application Netherlands Nov. 25, 1960
8 Claims. (Cl. 92—169)

Known is a combination of two members movable relative to one another and arranged at least substantially co-axially, which combination separates two spaces between which a differential pressure prevails continuously or periodically. In this known combination, these members, at the surfaces facing one another, are constructed at least substantially cylindrically. In this case, one of the members is substantially rigid in a radial direction, whereas the other member comprises a flexible sheath-like element which on its whole circumference is connected to the member supporting it, and which in addition has a free end. This element counteracts the flow of medium from one space between the surfaces of the two members facing one another to the other space.

An example of such a combination is, for example, a piston in which a peripheral rubber sheath is connected with one of its ends to the outer surface of that piston. In this case, the free part of this sheath seals the space between the outside of the piston and the inside of the cylinder. This sealing is associated with friction of the surface of the rubber sheath along the inside of the cylinder surface.

The object of the present invention also is to provide a construction in which between two cylindrical reciprocating surfaces facing one another the flow of medium through the space between these surfaces is counteracted, in which, however, the requirement is imposed that this is not associated with large friction at these points. So in this case a definite narrow gap is intentionally maintained between the surfaces movable relatively to one another. This kind of sealing is known per se; it is found, for example, in so-called labyrinth packings, in which a space between a piston and a cylinder is present and in which, to counteract the flow of medium, at least one of the surfaces is provided with a large number of juxtaposed shallow grooves which are at right angles to the direction of motion. However, it has appeared in practice that, also in connection with the high temperatures sometimes occurring during operation, these sealings do not always give satisfaction because difficulties are experienced by the different coefficients of expansion of the two members, such, for example, as a piston and a liner.

In order to mitigate the above drawbacks, the combination according to the invention of the type described above, is characterized in that the flexible sheath-like element is manufactured from metal and that this first sheath-like element is connected to an annular member. This annular member in turn is connected to a second sheath-like metal element which is also flexible and which extends co-axially with the first sheath-like element so that an annular gap is formed between the two sheath-like elements. At some distance from the annular element and in the direction of the free end of the first sheath-like element, the second sheath-like element is connected to a base portion of the member in question. The lengths of the sheath-like flexible elements in this case are at least four times the associated wall thicknesses. If in the spaces which are separated by the combination the same pressure prevails, the separated surfaces of the first sheath-like element facing one another and the part of the combination lying opposite to it have a difference in diameter of at least 0.2 mm.

So in the device according to the invention, a metal flexible sheath-like element is used which, in the rest condition, is located at a very small distance from the opposite part of the combination. The flexible construction of the sheath renders it possible that it is deformed flexibly under the influence of the pressures and differential pressures occurring in the combination, however, with such a small value that the opposite surfaces of the part of the combination movable relatively to one another in general do not touch one another. Nevertheless, the small value of the free aperture between these two surfaces guarantees a good sealing between these surfaces.

Due to the fact that the surfaces facing one another of the members movable relatively to one another do not touch one another, it is not necessary to provide a lubricant between these surfaces. This is of importance in particular in those cases in which the medium which is located on one or on both sides of the movable member, has to remain free from lubricating oil.

In order to prevent the members movable with respect to one another from touching one another it will be clear that one of the two members has to be provided with a guide.

A further favourable embodiment of the combination according to the invention is characterized in that the flexible sheath-like elements have a length which is at most 15 times their wall thickness.

The surfaces of the members facing one another which form the combination may previously have a small difference in diameter in the case that the pressure in both spaces separated by the combination is the same. For this purpose, a favourable embodiment of the combination is characterized in that the axial cross-section of the annular member is proportioned so that the surface of this cross-section corresponds to at least half the surface of the axial cross-section of the first sheath-like element.

It is possible to manufacture the sheaths, the base part and the relative members as a single unit, for example by a casting process. However, it is also possible to manufacture the sheaths and the members separately and to connect them together afterwards. For that purpose, a favourable embodiment of the combination according to the invention is characterized in that the sheath-like elements are connected together and to the member in question by a gas-tight welding or soldering connection. Instead of a welding or soldering connection, a rivet or shrink connection may be used, in which sealing O-rings are used.

The combination according to the invention is particularly readily usable in a hot-gas reciprocating engine comprising a cylinder and a piston movable in it.

A hot-gas reciprocating apparatus is understood to means in this connection a hot-gas reciprocating engine and in addition a refrigerator and a heat-pump operating according to the reverse hot-gas reciprocating engine principle. In these machines, a medium is forced by reciprocating piston-shaped members between a warmer and a colder space of the apparatus, via a regenerator.

In these machines it is of the utmost importance for the efficiency and the load of the bearing that the pressure in the chamber below the piston which is sealed from the surroundings, is maintained as well as possible at the mean pressure which prevails in the space above the piston. For this purpose it is necessary that the quantity of medium in the space below the piston remains constant. This is readily realizable with the combination according to the invention, for, although invariably a gap remains open between the surfaces facing one another of the members movable relatively to one another, the medium will experience substantially the same resistance to flow in both directions when flowing through this gap. As a result of this, the quantity of medium which flows to the space below the piston in case of a high pressure in the space above the piston, will be equal to the quantity of medium which in the other case flows from the space below the piston to the space above the piston.

An additional advantage of the use of the combination according to the invention in a hot-gas reciprocating apparatus consists in that as a result of the absence of lubricating oil between the surfaces moving along one another, the possibility does not exist now that lubricating oil rests are conducted along by the medium as a result of which the regenerator would be put out of action.

In order that the invention may readily be carried into effect, three embodiments thereof will now be described more fully, by way of example, with reference to the accompanying drawing, in which FIGURE 1 shows diagrammatically a piston and a cylinder in an axial cross-section, in which the piston is provided with two sheath-like elements.

Figure 2:
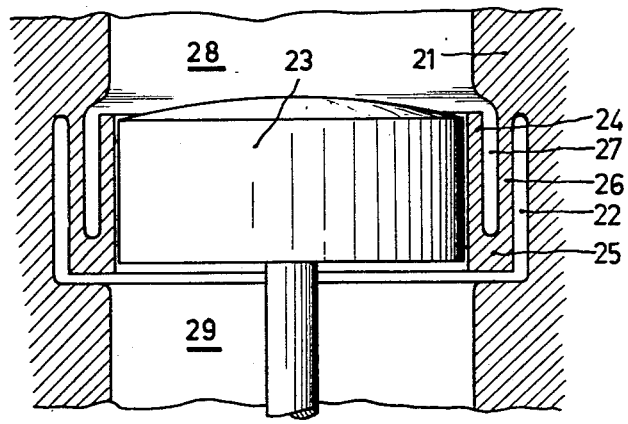

FIGURE 2 also shows diagrammatically an axial cross-section of a cylinder and a piston, in which two sheath-like elements are connected to the cylinder wall.

Figure 3:
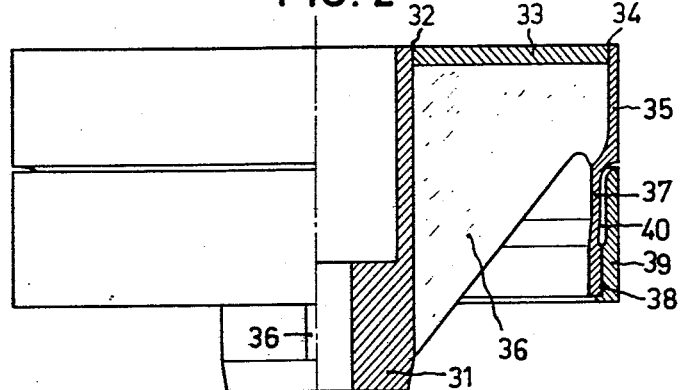

FIGURE 3 shows an axial cross-section of a piston which is provided with two sheath-like elements.

In FIGURE 1, the cylinder wall is indicated by 11, and the piston movable in this cylinder is built up from the base portion 12 which forms one assembly with the end face 13 of the piston. The flexible sheath-like element 14 is connected to the base portion 12. The annular structural member 15 is rigidly connected to this sheath-like element 14, which member 15 supports the flexible sheath-like element 16. The sheath-like element 16 is provided coaxial by with the sheath-like element 14 so that an annular gap 17 remains open between these elements.

The operation of this combination is as follows. When in the space 18 which is above the end face 13 of the piston a higher pressure prevails than in the space 19 which is below the piston, this higher pressure will also occur in the space 17, as a result of which the sheath-like elements 14 and 16 will be deformed to some extent, as a result of which the gap between the sheath-like element 16 and the cylinder wall 11 is narrowed somewhat. In the other case, that is to say when the pressure in the space 19 is higher than that in the space 18, this pressure will be exerted only on the side of the sheath-like element 14 remote from the cylinder wall 11. As a result of this, the element 14 will experience a slight deformation so that this element becomes located somewhat nearer to the cylinder wall 11, as a result of which in this case also a narrowing occurs of the passage between the sheath 16 and the cylinder wall 11. Since the narrowing of the gap between the piston and the cylinder wall may be equal in both cases, the same quantity of medium will flow through the gap per stroke.

In FIGURE 2, the substantially undeformable piston is indicated by 23. This piston is movable in the cylinder 21. The sheath-like element 26 is connected to this cylinder 21 which element is peripherally connected rigidly to the annular structural member 25. The sheath-like element 24 is connected to the structural member 25 which element 24 is provided co-axially with the sheath-like element 26 so that between these elements an annular gap 27 occurs. Between the sheath-like element 26 and the cylinder liner 21 a second annular gap 22 occurs.

The operation of this combination is as follows. When in the space 28 a higher pressure occurs, this pressure will also occur in the space 27 which is between the sheath-like elements 24 and 26. The sheath-like element will be deformed to some extent under the influence of this high pressure, as a result of which the space between the element 24 and the piston 23 is narrowed, somewhat. If in the other case a higher pressure occurs in the space 29, this pressure will also occur in the space 22 which is between the cylinder wall 21 and the sheath-like element 26. Forces which are directed radially inwardly are exerted on the element 26 by this pressure, under the influence of which this element will be deformed somewhat, as a result of which in this case also a narrowing of the space between the sheath-like element 24 and the piston 23 is obtained. In this construction also it is achieved that the space between the piston 23 and the sheath-like element during operation of the combination has substantially the same resistance to flow in the reciprocating stroke.

FIGURE 3 shows a piston which is built up from the member 31 to which the base portion 33 is connected by a soldering joint 32. The sheath-like structural member 35 is connected to the base portion 33 by means of a soldering joint 34. Supports 36 are regularly divided on the circumference of the member 31, which supports are also connected to the sheath-like structural member 35 and the base portion 33. To the flexible deformable portion 37 of the sheath-like structural member 35, a likewise flexible sheath-like element 39 is connected, by means of a soldering joint 38, which is provided co-axially with the portion 37 of the sheath-like structural member 35 so that between these elements a gap 40 is present.

What is claimed is:

1. A combination of two members movable relatively to one another and provided at least substantially co-axially, which combination separates two spaces between which a differential pressure prevails continuously or periodically, which members, at their surfaces facing one another, are constructed at least substantially cylindrically, in which combination one of the members is substantially rigid in a radial direction, and comprising a first flexible sheath-like element occurring on the other member which element on its whole circumference is connected to the member supporting it and in addition has a free end, which element counteracts the flow of medium from one space between the surfaces facing one another of the two members to the other space, a base portion, an annular member connected thereto, a second flexible sheath-like metal element, said first flexible sheath-like element being manufactured from metal and connected to said annular member which in turn is connected to said second flexible sheath-like metal element which lies co-axial with the first sheath-like element so that between the two sheath-like elements an annular gap is present and the second sheath-like element is connected, at some distance from said annular member and in the direction of the free end of the first sheath-like element to said base portion, the lengths of said sheath-like flexible elements being at least four times the associated wall thicknesses, while, when in the spaces which are separated by the combination the same pressure prevails, the separated surfaces facing one another of the sheath-like element and the part of the combination opposite to it have a difference in diameter of at most 0.2 mm.

2. A combination as claimed in claim 1, wherein the sheath-like elements have a length which is at most 15 times their wall thickness.

3. A combination as claimed in claim 1, wherein the axial cross-section of the annular member is proportioned so that the surface of this cross-section corresponds to at least half of the surface of the axial cross-section of the first sheath-like element.

4. A combination as claimed in claim 1, wherein the sheath-like elements are connected together by a soldering joint.

5. A piston-shaped member having a base portion comprising a first sheath-like flexible element, a second sheath-like flexible element, an annular member, said first sheath-like flexible element being connected to said annular member which member in turn is connected to said second likewise flexible sheath-like metal element which lies co-axial with the first sheath-like element, so that between the two sheath-like elements an annular gap occurs and the second sheath-like element is connected, at some distance from the annular member and in the direction of the free end of the first sheath-like element, to said base portion occurring on the piston-shaped member, the lengths of said sheath-like flexible elements being at least four times the associated wall thicknesses.

6. A piston-shaped member as claimed in claim 5, wherein the sheath-like elements have a length which is at most 15 times their wall thickness.

7. A piston-shaped member as claimed in claim 5 wherein the axial cross-section of the annular member is proportioned so that the surface of this cross-section corresponds to at least half of the surface of the axial cross-section of the first sheath-like flexible element.

8. A combination as claimed in claim 1 wherein said sheath-like elements are connected together by a gas-tight welding.

References Cited in the file of this patent
UNITED STATES PATENTS

| | | |
|---|---|---|
| 1,456,727 | Franchi | May 29, 1923 |
| 2,992,052 | De John | July 11, 1961 |